(12) United States Patent
Marutani et al.

(10) Patent No.: US 9,634,314 B2
(45) Date of Patent: Apr. 25, 2017

(54) BATTERY PACK AND METHOD OF MONITORING REMOVAL OF SECONDARY BATTERY IN BATTERY PACK

(75) Inventors: Kentaro Marutani, Kanagawa (JP); Atsushi Ozawa, Kanagawa (JP); Shin Hotta, Tokyo (JP); Shinichi Uesaka, Kanagawa (JP)

(73) Assignee: SONY CORPORATION, Tokyo (JP)

(*) Notice: Subject to any disclaimer, the term of this patent is extended or adjusted under 35 U.S.C. 154(b) by 932 days.

(21) Appl. No.: 13/824,780

(22) PCT Filed: Sep. 5, 2011

(86) PCT No.: PCT/JP2011/070114
§ 371 (c)(1),
(2), (4) Date: Mar. 18, 2013

(87) PCT Pub. No.: WO2012/039271
PCT Pub. Date: Mar. 29, 2013

(65) Prior Publication Data
US 2013/0177783 A1 Jul. 11, 2013

(30) Foreign Application Priority Data
Sep. 24, 2010 (JP) .................................. 2010-213043

(51) Int. Cl.
*H01M 2/00* (2006.01)
*H01M 2/10* (2006.01)
(Continued)

(52) U.S. Cl.
CPC ............. *H01M 2/34* (2013.01); *H01M 2/105* (2013.01); *H01M 2/1061* (2013.01);
(Continued)

(58) Field of Classification Search
IPC ............. H01M 2/00,2/10, 6/50, 6/5044, 10/425
See application file for complete search history.

(56) References Cited

U.S. PATENT DOCUMENTS 8,426,079 B2 * 4/2013 Okada ................ H01M 2/1077
429/511
2007/0229026 A1 10/2007 Morioka et al.

FOREIGN PATENT DOCUMENTS

CN 100544067 9/2009
CN 103098259 5/2013
(Continued)

OTHER PUBLICATIONS

Chinese Office Action issued Sep. 3, 2014, for corresponding Chinese Appln. No. 201180044717.0.
(Continued)

*Primary Examiner* — Patrick Ryan
*Assistant Examiner* — Julian Anthony
(74) *Attorney, Agent, or Firm* — Chip Law Group

(57) ABSTRACT

A battery pack and a simple construction is provided. The battery pack includes a plurality of secondary batteries, a housing storing the plurality of secondary batteries, and an inspection circuit stored in the housing. The housing includes a main body section and a closing member to close an opening for taking the plurality of secondary batteries in and out of the main body section, and includes a plurality of fixing members for fixing the closing member on the main body section, the plurality of fixing members being made of a conductive material. An attachment state of the fixing members with respect to the closing member and the main body section is monitored by the inspection circuit, and an attachment order of the fixing members with respect to the closing member and the main body section is memorized by the inspection circuit.

12 Claims, 3 Drawing Sheets

(51) Int. Cl.
*H01M 6/42* (2006.01)
*H01M 2/34* (2006.01)
*H01M 10/48* (2006.01)
*H01M 10/0525* (2010.01)

(52) U.S. Cl.
CPC ....... *H01M 2/1077* (2013.01); *H01M 10/482* (2013.01); *H01M 10/0525* (2013.01); *H01M 2220/20* (2013.01); *Y02E 60/122* (2013.01)

(56) References Cited

FOREIGN PATENT DOCUMENTS

| | | |
|---|---|---|
| JP | 2002-041361 | 2/2002 |
| JP | 2005-353518 | 12/2005 |
| JP | 2006-324075 | 11/2006 |
| JP | 2007128674 | 5/2007 |
| JP | 2007273315 | 10/2007 |
| JP | 2007-287081 | 11/2007 |
| JP | 2007335330 | 12/2007 |
| JP | 2010-118041 | 5/2010 |

OTHER PUBLICATIONS

Japanese Intellectual Property Office, Office action issued in connection with Japanese Patent Application No. 2010-213043, dated Jun. 17, 2014. (3 pages).

\* cited by examiner (A)

(B)

BATTERY PACK AND METHOD OF MONITORING REMOVAL OF SECONDARY BATTERY IN BATTERY PACK

CROSS REFERENCES TO RELATED APPLICATIONS

The present application is a national stage of International Application No. PCT/JP2011/070114 filed on Sep. 5, 2011 and claims priority to Japanese Patent Application No. 2010-213043 filed on Sep. 24, 2010, the disclosure of which is incorporated herein by reference.

BACKGROUND

The present invention relates to a battery pack, and to a method of monitoring removal of a secondary battery in the battery pack.

A battery pack has been heretofore used for various portable apparatuses such as a mobile phone, a digital still camera, a portable game machine, a notebook personal computer, and an electric power tool. Currently, applications thereof are not limited thereto, and the battery pack has been increasingly used in the fields necessitating a higher output and a higher capacity such as an electric assist bicycle, an electric vehicle, and a home electric storage device.

Examples of secondary batteries built into a battery pack include a lithium ion secondary battery, which is currently one of the most-mainly-used secondary batteries therefor. The lithium ion secondary battery has multiple characteristics as follows. That is, the lithium ion secondary battery is repeatedly usable by charging, has a high voltage output, has high energy density, has little self-discharge, and has a long life. Therefore, the lithium ion secondary battery is used in an extremely-broad range. However, since the lithium ion secondary contains a combustible material, adequate care needs to be exercised in handling thereof. Further, for addressing needs of apparatuses such as a higher output and a higher capacity, the number of cases in which secondary batteries (single cells) are multiply-series-connected or multiply-parallel-connected, and are used in a state of a battery pack (assembled battery), and therefore, more proper handling thereof is desired. Furthermore, in order to determine whether or not a battery pack mounted on an apparatus is safely usable for the apparatus, many battery certification systems for acting certification between an apparatus and a battery pack have been introduced. Accordingly, usage of an inappropriate battery pack is allowed to be restricted by various certification methods including whether or not an appropriate battery pack is used and whether or not an appropriate protection circuit is included.

There is concern that what we call an altered battery pack is manufactured and distributed by disassembling a spent battery pack, taking out a secondary battery, and building the secondary battery into other battery pack. In such an altered battery pack, undesired over-charge, undesired over-discharge, and/or the like may occur by building in an inappropriate secondary battery, and therefore, a safety issue easily occurs. Therefore, it is strongly desired to appropriately suppress manufacture and distribution of the altered battery pack by disqualifying such an altered battery pack from certification and/or substantially disabling a function of the altered battery pack.

As such a battery pack aimed at preventing alteration, a battery pack provided with an IC tag in which predetermined information is recorded is known from, for example, Japanese Unexamined Patent Application Publication No. 2006- 324075. Further, a battery pack in which a detachment recognition tape having a detachment recognition function with which a fact that a battery has been separated from a package case is certified is adhered to a region from the battery to a member adjacent thereto is known from Japanese Unexamined Patent Application Publication No. 2005-353518.

CITATION LIST

Patent Literature

[PLT 1]: Japanese Unexamined Patent Application Publication No. 2006-324075
[PLT 2]: Japanese Unexamined Patent Application Publication No. 2005-353518

SUMMARY

However, in the technology disclosed in Japanese Unexamined Patent Application Publication No. 2006-324075, since the IC tag is used, there is a disadvantage that the manufacturing cost of the battery pack is increased. In addition thereto, in the case where the battery pack is disassembled so that the IC tag is not broken, such technology becomes ineffective for preventing alternation. Further, in the technology disclosed in Japanese Unexamined Patent Application Publication No. 2006-324075, it may be not possible to prevent taking a battery out of the battery pack and manufacturing an altered battery pack.

Therefore, it is an object of the present invention to provide a battery pack capable of preventing an altered battery pack from being manufactured by a simple structure and a simple construction, and to a method of monitoring removal of a secondary battery from the battery pack.

A battery pack of the present invention to achieve the foregoing object includes a plurality of secondary batteries, a housing storing the plurality of secondary batteries, and an inspection circuit stored in the housing. The housing includes a main body section and a closing member to close an opening for taking the plurality of secondary batteries in and out of the main body section, and includes a plurality of fixing members for fixing the closing member on the main body section, the plurality of fixing members being made of a conductive material. An attachment state of the fixing members with respect to the closing member and the main body section is monitored by the inspection circuit, and an attachment order of the fixing members with respect to the closing member and the main body section is memorized by the inspection circuit.

A method of monitoring removal of a secondary battery in a battery pack of the present invention to achieve the foregoing object (hereinafter simply referred to as "monitoring method of the present invention" in some cases) is a method of monitoring removal of a secondary battery in the foregoing battery pack of the present invention, wherein when an order of removing the fixing members from the closing member and the main body section is different from a removal order based on the attachment order, a function of the battery pack is stopped.

In the battery pack of the present invention, the attachment state of the fixing members with respect to the closing member and the main body section is monitored by the inspection circuit, and the attachment order of the fixing members with respect to the closing member and the main body section is memorized by the inspection circuit. Therefore, when the order of removing the fixing members from the closing member and the main body section is different from the removal order based on the attachment order, the function of the battery pack is allowed to be stopped. Further, in the monitoring method of the present invention, when the order of removing the fixing members from the closing member and the main body section is different from the removal order based on the attachment order, the function of the battery pack is stopped. Therefore, although the battery pack has a simple structure and a simple configuration, it is possible to prevent a secondary battery from being taken out inappropriately. Consequently, alteration of a battery pack such as illegal replacement of a secondary battery is allowed to be securely prevented. Furthermore, an existing secondary battery is allowed to be used.

Additional features and advantages are described herein, and will be apparent from the following Detailed Description and the figures.

DESCRIPTION OF EMBODIMENT DETAILED DESCRIPTION

Figure 1:
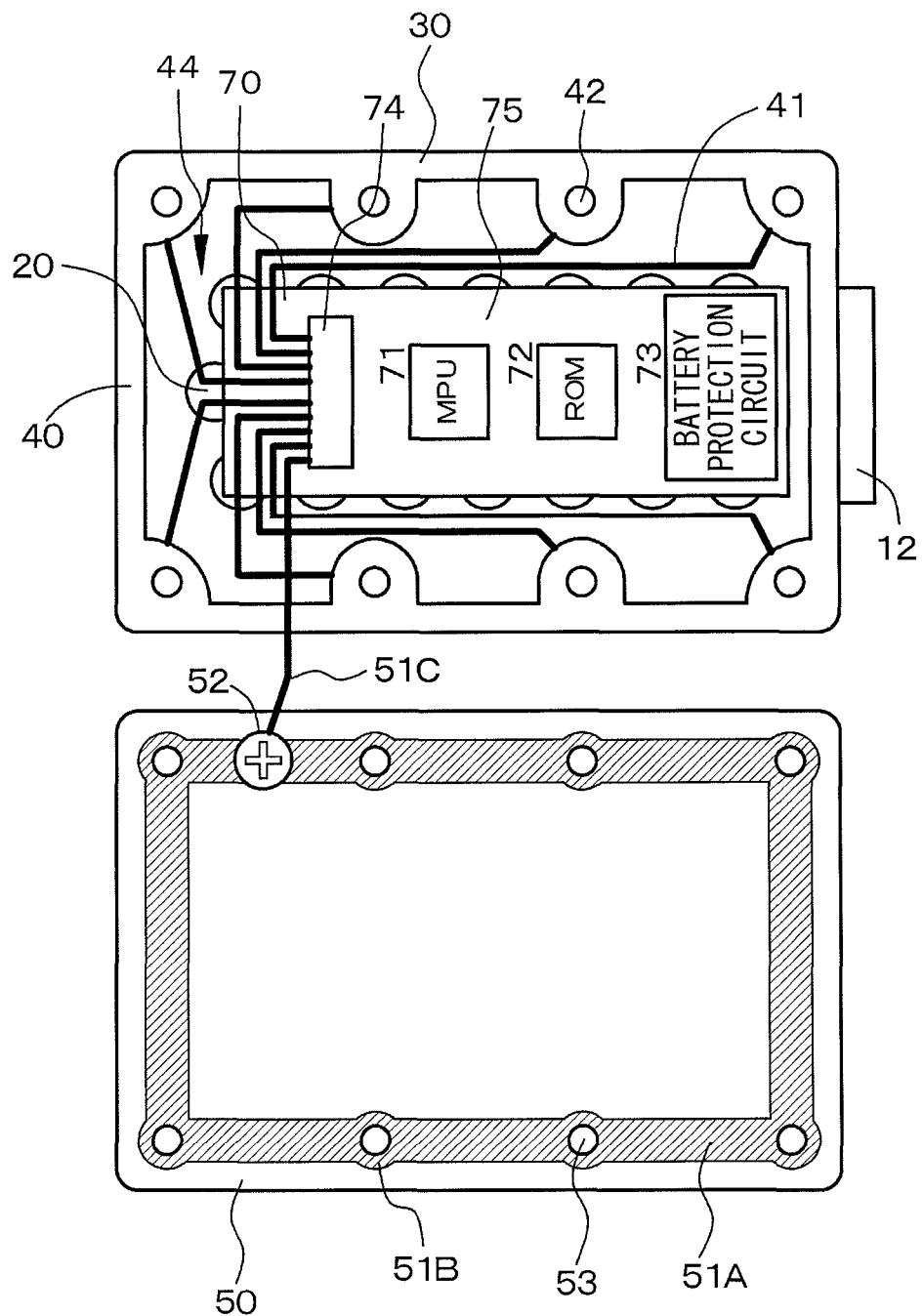
FIG. 1 is a schematic view illustrating a state in which a closing member of a battery pack according to a first embodiment is removed.

The present invention will be hereinafter described based on an embodiment with reference to the drawings. However, the present invention is not limited to the embodiment, and various numerical values and various materials in the embodiment are merely exemplifications. It is to be noted that the description will be given in the following order.
1. General Description of Battery Pack of Present Invention and Method of Monitoring Removal of Secondary Battery of Present Invention
2. First Embodiment (Battery Pack of Present Invention and Method of Monitoring Removal of Secondary Battery of Present Invention) and Others

[General Description of Battery Pack of Present Invention and Method of Monitoring Removal of Secondary Battery of Present Invention]

In the battery pack of the present invention, when the order of removing the fixing members from the closing member and the main body section is different from the removal order based on the attachment order memorized by the inspection circuit, the function of the battery pack is allowed to be stopped.

In the battery pack of the present invention including the foregoing preferred form and the monitoring method of the present invention, each of the fixing members may be formed of a screw, specifically, may be formed of a screw made of a metal or an alloy. However, the configuration thereof is not limited thereto, and as the fixing members, a draw latch, a catch clip, a T-shaped zipper, and a cicada-shaped cover latch may be exemplified.

In the battery pack of the present invention and the monitoring method of the present invention including the foregoing preferred form and the foregoing preferred configuration, a bush may be attached to a section of the main body section to which each of the fixing members is attached, the bush being made of a conductive material, specifically being made of a metal or an alloy, being connected to the inspection circuit through a first wiring, and being engaged with each of the fixing members. The fixing members attached to the closing member may be connected to the inspection circuit through a second wiring.

Further, in the battery pack of the present invention and the monitoring method of the present invention including the foregoing preferred form and the foregoing preferred configuration, the battery pack may be given an identification (a serial ID such as a barcode). The identification may have a predetermined relation with the attachment order. Specifically, by analyzing (deciphering) the identification, the attachment order may be ascertained.

Further, in the battery pack of the present invention and the monitoring method of the present invention including the foregoing preferred form and the foregoing preferred configuration, the attachment order may be encrypted. It is to be noted that encryption itself may be performed by a known method.

In the battery pack of the present invention and the monitoring method of the present invention including the foregoing preferred form and the foregoing preferred configuration (hereinafter simply and collectively referred to as "the present invention" in some cases), examples of secondary batteries include a lithium ion secondary battery. However, the secondary battery type is not limited thereto, and the secondary battery type to be used may be selected as appropriate depending on desired characteristics. The configuration and the structure of the secondary battery may be a known configuration and a known structure. The shape of the secondary battery may be a known cylindrical type and a known square type. The number of secondary batteries configuring the battery pack may be determined as appropriate depending on desired characteristics.

The main body section and the closing member configuring the housing may be made of a non-conductive material (insulating material) such as a plastic material, but the material thereof is not limited thereto. The main body section and the closing member may be made of a metal or an alloy, as long as electric insulation with respect to the fixing members and/or the like is allowed to be secured thereby. In the case where the main body section is made of various plastic materials, the main body section and the bush are allowed to be integrally formed. In the case where the closing member is made of various plastic materials, the closing member and part of the second wiring are allowed to be integrally formed. One of the first wiring and the second wiring may be grounded. Although the shape of the main body section is substantially arbitrary, a cube, a rectangular solid, a cylinder column, and a rectangular column may be exemplified. Examples of the position relation of the closing member with respect to the main body section include a form in which an opening provided on the top surface of the main body section is covered with the closing member, a form in which an opening provided on a side surface of the main body section is covered with the closing member, and a form in which an opening provided on the bottom surface of the main body section is covered with the closing member.

The closing member may be fixed on the main body section only by the plurality of fixing members. Alternatively, the main body section may be linked with the closing member with the use of a hinge, and further the closing member may be fixed on the main body section by the plurality of fixing members. The fixing members may be made of a metal or an alloy. Although the number of the fixing members is not limited, six or more may be exemplified as the number thereof.

The inspection circuit itself may be configured of a known circuit including an MPU and a memory means (for example, configured of an EEPROM). An electric source of the inspection circuit may be the secondary batteries configuring the battery pack. The battery pack includes a battery protection circuit. To stop a function of the battery pack, the battery protection circuit may be activated. Monitoring of attachment state of the fixing members with respect to the closing member and the main body section by the inspection circuit may be constantly performed, or may be performed at predetermined time intervals.

In the fixing members with respect to the closing member and the main body section, any of the following methods may be adopted, though not limited thereto:

(1) a method in which an attachment order of the fixing members is arbitrary (random), and the attachment order of the fixing members is monitored and memorized by the inspection circuit,
(2) a method in which an attachment order of the fixing members is arbitrary (random), and the attachment order of the fixing members is memorized in the inspection circuit from outside,
(3) a method in which an attachment order of the fixing members is previously determined, and the attachment order of the fixing members is monitored and memorized by the inspection circuit,
(4) a method in which an attachment order of the fixing members is previously determined, and the attachment order of the fixing members is memorized in the inspection circuit from outside, and
(5) a method in which an attachment order of the fixing members is previously determined, and the attachment order of the fixing members is previously memorized in the inspection circuit.

Further, the order of removing the fixing members from the closing member and the main body section based on the attachment order may be inverted with respect to the attachment order, or may be a removal order obtained based on a predetermined arithmetic rule from the attachment order.

The battery pack in the present invention may be applied to, for example, an electric vehicle (EV), an electric motorcycle, an electric assist bicycle, an electric power tool, a home energy server (home electric storage device), a personal computer, a mobile phone, a PDA, a digital still camera, a video camcorder, a camcorder, a music player, a medical device, a toy, and the like.

First Embodiment

Figure 2:
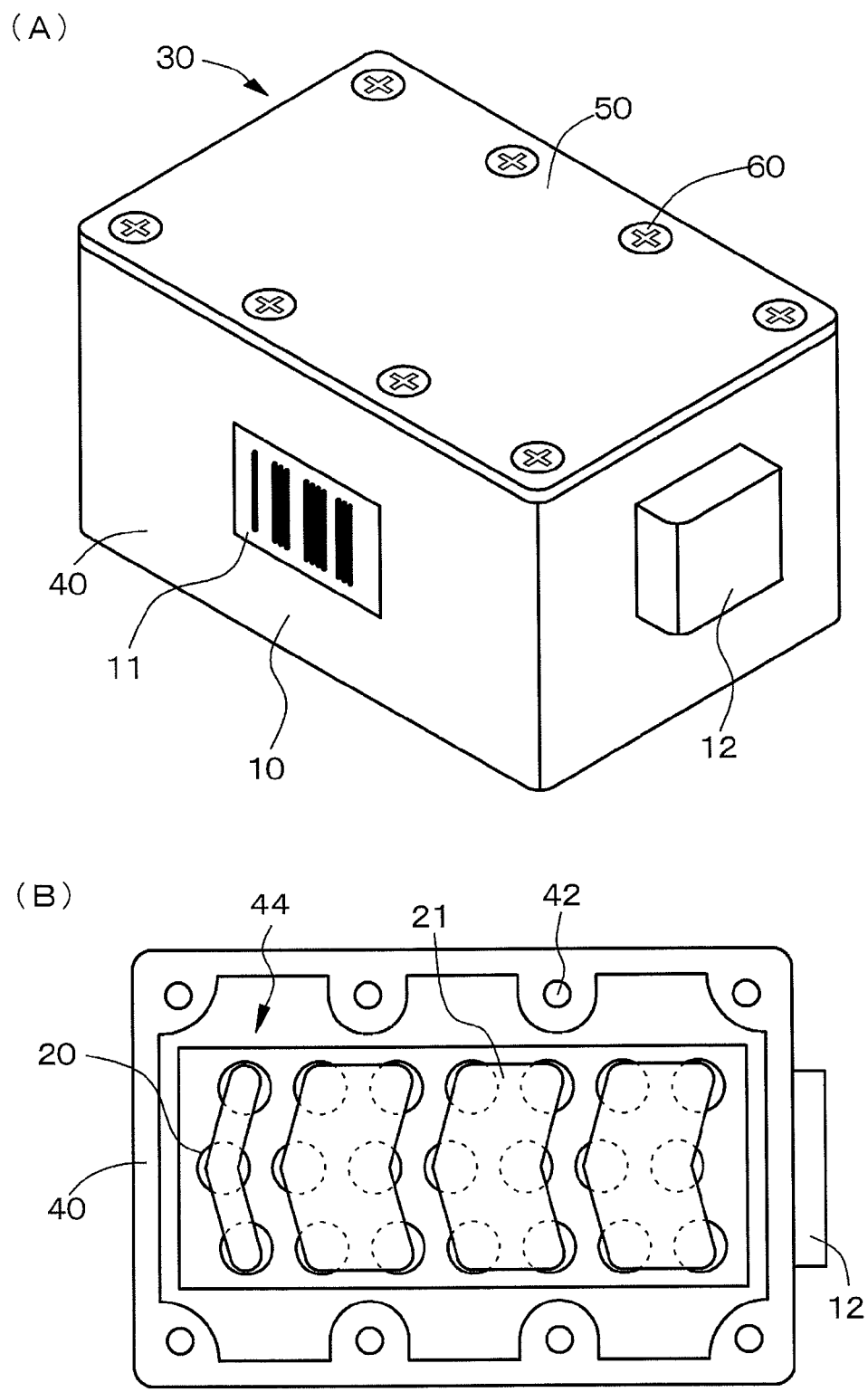
FIGS. 2(A) and 2(B) are respectively a schematic perspective view of the battery pack and a schematic view of a state in which the closing member of the battery pack 1 according to the first embodiment is removed and a printed-wiring board is further removed to expose secondary batteries.
Figure 3:
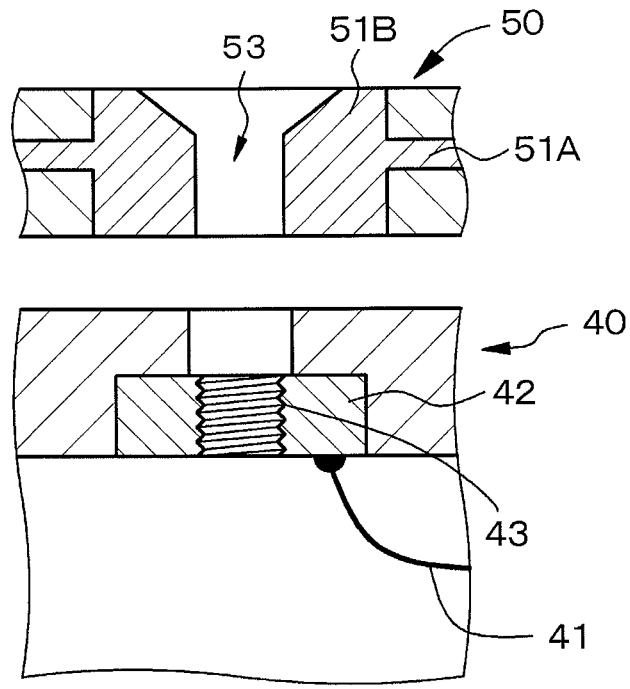
FIGS. 3(A) and 3(B) are schematic and partial cross sectional views of an enlarged main body section and an enlarged closing member configuring a housing.
Figure 3:
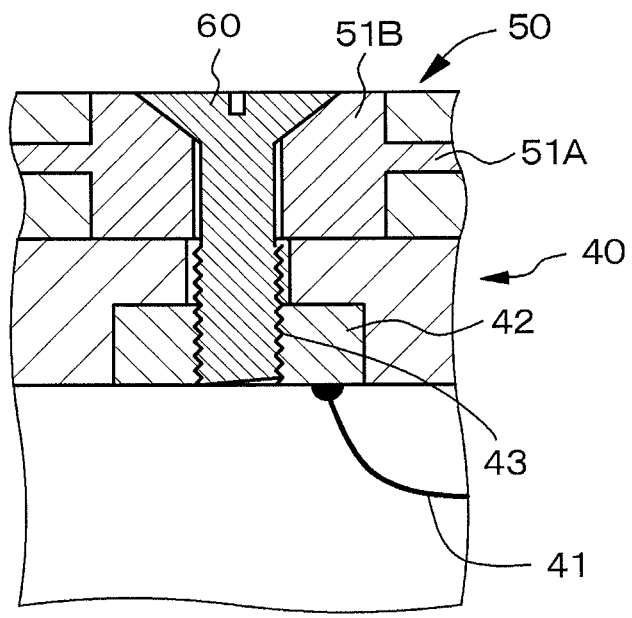

A first embodiment relates to the battery pack of the present invention and the method of monitoring removal of a secondary battery 20 in a battery pack of the present invention. FIG. 1 illustrates a schematic view showing a state in which a closing member of a battery pack according to the first embodiment is removed. Further, FIGS. 2(A) and 2(B) are respectively a schematic perspective view of the battery pack and a schematic view of a state in which the closing member of the battery pack 1 according to the first embodiment is removed and a printed-wiring board is further removed to expose secondary batteries. Further, FIGS. 3(A) and 3(B) illustrate schematic and partial cross sectional views of an enlarged main body section and an enlarged closing member configuring a housing. FIG. 3(A) illustrates a state before the closing member is fixed on the main body section, and FIG. 3(B) illustrates a state after the closing member is fixed on the main body section by a fixing member.

A battery pack 10 of the first embodiment includes (A) a plurality of secondary batteries 20, (B) a housing (a case) 30 storing therein the plurality of secondary batteries 20, and (C) an inspection circuit (an inspection means or an inspection apparatus) 70 stored in the housing 30.

The housing 30 includes a main body section 40 and a closing member 50 to close an opening 44 for taking the plurality of secondary batteries 20 in and out of the main body section 40. Further, the housing 30 includes a plurality of fixing members 60 made of a conductive material, for fixing the closing member 50 on the main body section 40. An attachment state of the fixing members 60 with respect to the closing member 50 and the main body section 40 is monitored by the inspection circuit 70. Further, attachment order of the fixing members 60 with respect to the closing member 50 and the main body section 40 is memorized by the inspection circuit 70.

Further, a bush 42 that is made of a conductive material, specifically, a metal or an alloy (more specifically, stainless steel), is connected to the inspection circuit 70 through a first wiring 41, and is engaged with the fixing member 60 is attached to a section of the main body section 40 to which each of the fixing members 60 is attached. It is to be noted that the first wiring 41 is attached to the bush 42 by an appropriate method. Further, the fixing members 60 attached to the closing member 50 are connected to the inspection circuit 70 through second wirings 51A, 51B, and 51C. Specifically, the fixing members 60 are grounded through the second wirings 51A, 51B, and 51C. A part of the second wiring 51B is provided with a through-hole 53 for the passage of the fixing member 60. Further, the second wiring 51C connected to the inspection circuit 70 through a connector 74 is electrically connected to the first wiring 51A through a fixing screw 52 made of stainless steel.

The secondary battery 20 is formed of a known cylindrical-type lithium ion secondary battery. In the battery pack 10, three secondary batteries 20 are parallel-connected by a metal connection plate 21, and seven secondary battery groups each configured of such parallel-connected secondary batteries 20 are series-connected by the metal connection plate 21. The main body section 40 and the closing member 50 configuring the housing 30 are made of a non-conductive material (insulating material) such as a plastic material, and more specifically, are made of, for example, an ABS resin, a PS resin, or a POM resin. Such a configuration is obtainable through integral formation of the second wirings 51A and 51B and the closing member 50. Further, such a configuration is obtainable through integral formation of the bush 42 and the main body section 40. Although the shape of the main body section 40 is inherently arbitrary, the shape thereof is a rectangular solid in the first embodiment. The closing member 50 seals the opening 44 provided on the top surface of the main body section 40. The fixing member 60 is formed of a screw, specifically, is formed of a screw made of a stainless steel. Incidentally, in the first embodiment, the closing member 50 is fixed on the main body section 40 only by the eight fixing members (screws) 60. It is to be noted that a referential number 11 represents an identification (a serial ID or a barcode) adhered to a side wall of the main body section 40, and a referential number 12 represents an output section.

The inspection circuit 70 itself is configured of a known circuit including an MPU 71 and a memory means (for example, configured of an EEPROM) 72. An electric source of the inspection circuit 70 is the secondary batteries 20 configuring the battery pack 10. The battery pack 10 includes a known battery protection circuit 73. To stop a function of the battery pack 10, the battery protection circuit 73 is activated. The MPU 71, the memory means 72, the battery protection circuit 73, and a connector 74 are attached to a printed-wiring board 75. Specifically, the battery protection circuit 73 is formed of a fuse. To stop the function of the battery pack 10, the battery protection circuit 73 is activated. In other words, the fuse is melted and cut under control of the MPU 71. Alternatively, a function of an over-discharge preventive switch and/or a function of an over-charge preventive switch included in the battery protection circuit 73 may be stopped. However, the configuration of the battery protection circuit 73 is not limited to the foregoing configuration. It is to be noted that although the battery pack 10 includes a known control circuit for controlling charge and discharge of the secondary batteries, the control circuit is not illustrated.

In assembling the battery pack 10, first, the secondary batteries 20 that are parallel-connected and series-connected by the metal connection plate 21 are contained in the main body section 40. Next, thereover, the printed-wiring board 75 to which the MPU 71 and the like are attached is attached to the main body section 40 by an appropriate method (see the upper part of FIG. 1). The main body section 40 is then covered with a closing member (specifically, a cover) 60, and each of the fixing members (screws) 60 is threadably mounted on the fixing section (the bush 42 provided with a tap section 43) provided in the main body section 40.

At this time, attachment order of the fixing members (screws) 60 is arbitrary (random). The attachment order of the fixing members 60 is monitored by the inspection circuit 70 (specifically, the MPU 71) operating based on a predetermined program, and memorized in the memory means 72. Alternatively, the following method may be adopted. In the method, the attachment order of the fixing members (screws) 60 is arbitrary (random). The attachment order of the fixing members 60 is memorized from outside (specifically, for example, through an unillustrated USB by using a personal computer) into the memory means 72 included in the inspection circuit 70. Alternatively, the following methods may be adopted. In one method, the attachment order of the fixing members 60 is previously determined. The attachment order of the fixing member 60 is monitored by the inspection circuit 70 (specifically, the MPU 71) operating based on a predetermined program, and memorized in the memory means 72. In another method, the attachment order of the fixing members 60 is previously determined. The attachment order of the fixing member 60 is memorized from outside (specifically, for example, through an unillustrated USB by using a personal computer) into the memory means 72 included in the inspection circuit 70. In still another method, the attachment order of the fixing members 60 is previously determined. The attachment order of the fixing members 60 is previously memorized in the memory means 72 included in the inspection circuit 70. It is to be noted that the attachment order may be encrypted based on a known method, and the resultant may be memorized in the memory means 72.

In the battery pack 10 of the first embodiment and the monitoring method of the first embodiment, in the case where removal order of the fixing members 60 from the closing member 50 and the main body section 40 is different from removal order based on the attachment order memorized by the inspection circuit 70, the function of the battery pack 10 is stopped.

Specifically, at the time of using the battery pack 10, the attachment state of the fixing members 60 with respect to the closing member 50 and the main body section 40 is monitored by the inspection circuit 70. Such monitoring may be constantly performed, or may be performed at predetermined time intervals. specifically, whether or not a current flows between the first wiring 41 and the second wirings 51A, 51B, and 51C is examined. In the case where a current flows therebetween, it is allowed to be determined that the fixing members 60 are attached to the closing member 50 and the main body section 40.

In the case where the secondary battery 20 is to be taken out from the battery pack 10, the fixing members 60 are removed from the closing member 50 and the main body section 40. At this time, the inspection circuit 50 examines order of removing the fixing members 60 from the closing member 50 and the main body section 40, and memorizes the removal order. Specifically, in the case where the fixing members 60 are removed from the closing member 50 and the main body section 40, a current stops flowing between the first wiring 41 and the second wirings 51A, 51B, and 51C. Therefore, the inspection circuit 50 examines and memorizes order of stop of current flow. Further, whether or not the finally obtained order of removing the fixing members 60 from the closing member 50 and the main body section 40 is different from the removal order based on the attachment order memorized by the inspection circuit 70 is examined. Alternatively, whether or not the finally obtained order of removing the fixing members 60 from the closing member 50 and the main body section 40 is different from the removal order based on the attachment order memorized by the inspection circuit 70 is examined every time when one of fixing members 60 is removed. If the finally obtained order of removing the fixing members 60 from the closing member 50 and the main body section 40 is different from the removal order based on the attachment order memorized by the inspection circuit 70, the function of the battery pack 10 is stopped. Accordingly, improper removal of the secondary battery 20 is allowed to be prevented, and alteration of the battery pack 10 that is an attempt to illegally replace the secondary battery 20 is allowed to be securely prevented.

The battery pack 10 is given the identification (a serial ID such as a barcode) 11. The identification 11 has a predetermined relation (unique relation) with attachment order. In other words, by analyzing (deciphering) the identification 11, the attachment order is ascertained. Therefore, in the case where replacement of the secondary battery 20 in the battery pack 10, repair of the battery pack 10, and/or the like is made by a manufacturer and/or the like, the fixing members 60 may be removed from the closing member 50 and the main body section 40 according to removal order based on attachment order obtained by analyzing (deciphering) the identification 11. Alternatively, the following method may be adopted. In the method, a manufacturer and/or the like records and archives attachment order, and informs the attachment order to a repair section or the like according to an inquiry from the repair section or the like. Alternatively, the following method may be adopted. In the method, an encrypted attachment order is downloaded from the memory means 72 to a personal computer through a USB, a decoding process is performed by the personal computer, and removal order is displayed on a display.

The present invention has been described with reference to the preferred embodiment. However, the present invention is not limited to the foregoing embodiment. The configurations and the structures of the battery pack, the secondary battery, the housing, the inspection circuit, and/or the like are merely exemplifications, and may be changed as appropriate. For example, in the embodiment, the cylindrical-type secondary battery is used. However, the secondary battery may be formed of a known square-type lithium ion secondary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A battery pack, comprising:
a plurality of secondary batteries;
a housing that stores the plurality of secondary batteries; and
an inspection circuit stored in the housing and includes a memory, wherein
the housing includes a main body section and a closing member to close an opening to take the plurality of secondary batteries in and out of the main body section, and includes a plurality of fixing members to fix the closing member on the main body section, wherein the plurality of fixing members are made of a conductive material, and
an attachment state of the plurality of fixing members with respect to the closing member and the main body section is detected by the inspection circuit, and an attachment order of the plurality of fixing members with respect to the closing member and the main body section is stored in the memory of the inspection circuit.

2. The battery pack according to claim 1, wherein
the inspection circuit comprises a battery protection circuit configured to stop a function of the battery pack in an event an order of removal of the plurality of fixing members from the closing member and the main body section is different from a removal order based on the attachment order stored in the memory of the inspection circuit.

3. The battery pack according to claim 1, wherein each of the plurality of fixing members is a screw.

4. The battery pack according to claim 1, wherein
a bush is attached to a section of the main body section to which each of the plurality of fixing members is attached, wherein the bush is made of a conductive material, connected to the inspection circuit through a first wiring, and engaged with each of the plurality of fixing members, and
the plurality of fixing members attached to the closing member are connected to the inspection circuit through a second wiring.

5. The battery pack according to claim 1, wherein
the battery pack is given an identification, and
the identification has a determined relation with the attachment order.

6. The battery pack according to claim 1, wherein the attachment order is encrypted.

7. A method of monitoring removal of a secondary battery in a battery pack, the battery pack including:
a plurality of secondary batteries,
a housing storing the plurality of secondary batteries, and
an inspection circuit stored in the housing,
the housing including a main body section and a closing member to close an opening for taking the plurality of secondary batteries in and out of the main body section, and including a plurality of fixing members for fixing the closing member on the main body section, the plurality of fixing members being made of a conductive material,
an attachment state of the plurality of fixing members with respect to the closing member and the main body section being monitored by the inspection circuit, and an attachment order of the plurality of fixing members with respect to the closing member and the main body section being memorized by the inspection circuit,
the method comprising: stopping a function of the battery pack in an event an order of removing the plurality of fixing members from the closing member and the main body section is different from a removal order based on the attachment order.

8. The method of monitoring removal of the secondary battery in the battery pack according to claim 7, wherein each of the plurality of fixing members is a screw.

9. The method of monitoring removal of the secondary battery in the battery pack according to claim 7, wherein
a bush is attached to a section of the main body section to which each of the plurality of fixing members is attached, the bush being made of a conductive material, being connected to the inspection circuit through a first wiring, and being engaged with each of the plurality of fixing members, and
the plurality of fixing members attached to the closing member are connected to the inspection circuit through a second wiring.

10. The method of monitoring removal of the secondary battery in the battery pack according to claim 7, wherein
the battery pack is given an identification, and
the identification has a determined relation with the attachment order.

11. The method of monitoring removal of the secondary battery in the battery pack according to claim 7, wherein the attachment order is encrypted.

12. A battery pack, comprising:
a plurality of secondary batteries;
a housing that stores the plurality of secondary batteries; and
an inspection circuit stored in the housing, wherein
the housing includes a main body section and a closing member to close an opening to take the plurality of secondary batteries in and out of the main body section, and includes a plurality of fixing members to fix the closing member on the main body section, wherein the plurality of fixing members are made of a conductive material,
an attachment state of the plurality of fixing members with respect to the closing member and the main body section is monitored by the inspection circuit, and an attachment order of the plurality of fixing members with respect to the closing member and the main body section is memorized by the inspection circuit, and
the plurality of fixing members are connected to the inspection circuit through a wiring.

* * * * *